March 21, 1933.   J. A. STREUN   1,902,674
ADJUSTABLE PICKER ROLLER
Filed Feb. 21, 1931

Inventor
John A. Streun

Jesse R. Stone
Lester B. Clark
Attorneys

Patented Mar. 21, 1933

1,902,674

UNITED STATES PATENT OFFICE

JOHN ARNOLD STREUN, OF SHERMAN, TEXAS, ASSIGNOR TO HARDWICKE-ETTER COMPANY, OF SHERMAN, TEXAS

ADJUSTABLE PICKER ROLLER

Application filed February 21, 1931. Serial No. 517,427.

My invention relates to cotton gins, and more particularly to the picker roll, which agitates the cotton so as to feed it to the gin saws in shape so that the said saws engage the lint of the cotton.

My invention is applicable to any ordinary type of cotton gin, and has for its purpose to provide an agitator roll adjacent the forward side of the gin saw cylinder which will agitate the cotton and also prevent the passage of the bolls of cotton downwardly past said agitator roll and away from the saws.

I desire to provide an agitator roll, which will be adjustable to and from the saw cylinder so as to accommodate different sizes and grades of cotton which are fed into the gin.

It is not understood to be new to adjust the picker roll, which acts to agitate the cotton, but the shaft of the picker roll is ordinarily mounted to swing to and from the gin cylinder, and when this means of adjustment is used, the operator cannot accurately position the roll at the point desired. It is, therefore, my object to provide a sliding mounting for the picker roll, which will allow it to be accurately adjusted at any desired point relative to the gin saws and at both ends of the shaft at once without difficulty.

Figure 1:
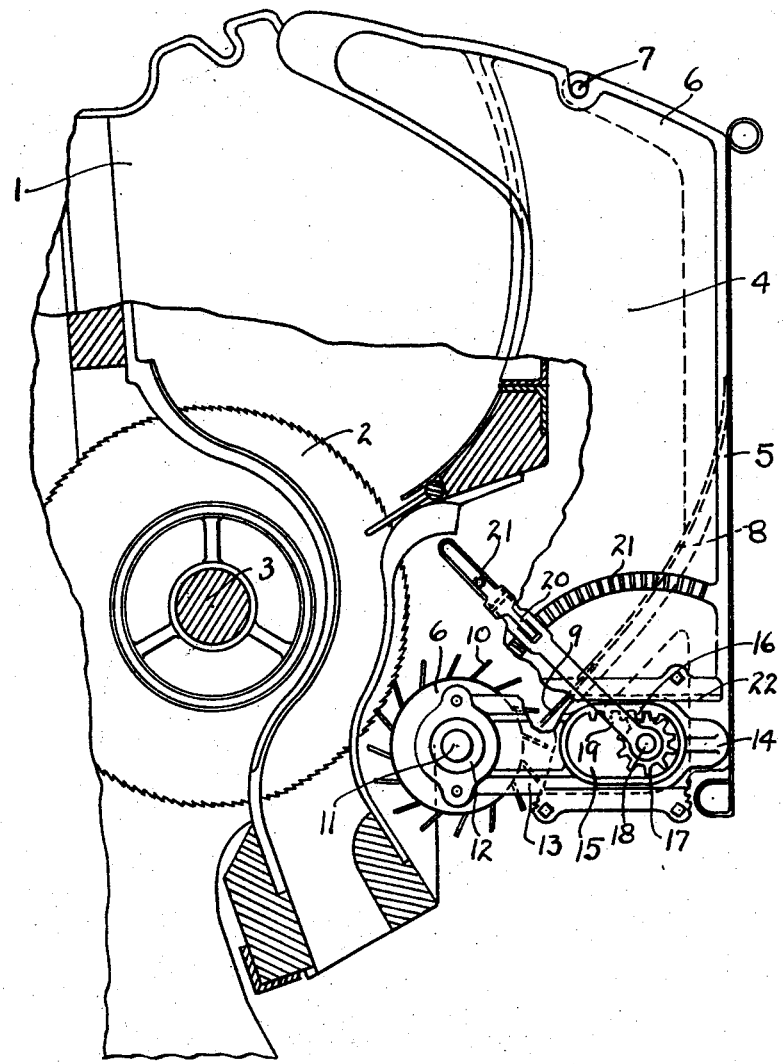

In the drawing herewith, Figure 1 is a broken detail partly in section through the forward side of a cotton gin, and illustrating the manner in which the adjustment of the picked roll is obtained.

Figure 2:
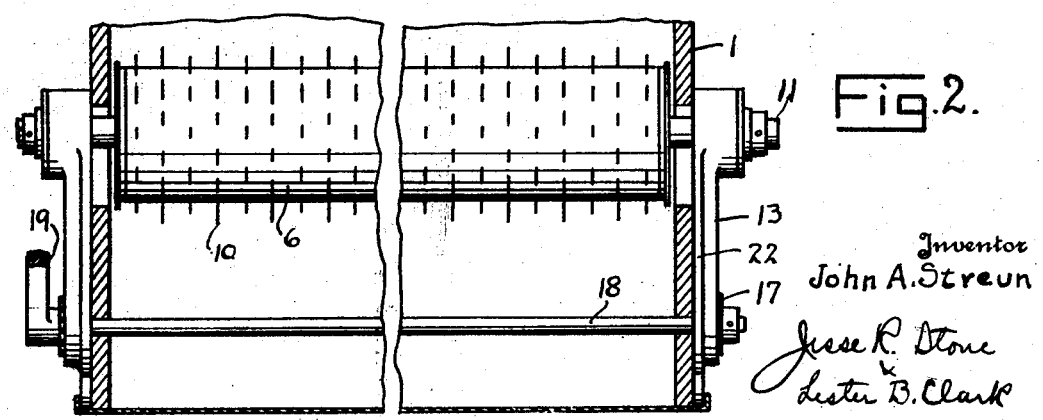

Figure 2 is a broken plan view partly in section through the gin housing and showing an arrangement whereby the roll is adjustable at both ends simultaneously.

In the drawing the housing 1 of the gin is shown only in a fragmentary way. The gin saws 2 are mounted upon a shaft 3 rotatable in a counter-clockwise direction as seen in Figure 1. The cotton fed downwardly through the passage 4 to the rear of the gin breast 5 is discharged against the picker roll 6.

The gin breast 5 is formed upon a frame, the upper end of which is extended slightly to the rear at 6 and pivoted in the frame at 7. It is, therefore, adapted to swing between the sides of the gin housing toward and away from the saw cylinder, toward the lower side of the gin breast is a deflecting board 8, which is curved inwardly to a point closely adjacent the picker roll 6, and is provided with prongs 9, which are adapted to interfit with the inclined spikes 10 projecting from the picker roll.

The spikes 10 upon the picker roll are adapted to interfit between the saws 2 of the saw cylinder and also between the prongs 9 at the lower end of the deflecting board 8, and thus assures that no cotton be allowed to pass the agitator roll in the feeding of the cotton to the saws.

The picker roll 6 is mounted upon a shaft 11 which is supported at its ends in bearings 12, secured at one end of a plate 13.

Said plate 13 is extended toward the forward side of the gin, and its outer end is formed with a rounded bumper 14, which bears against the swinging end portion 5 of the gin breast. Between the ends of the plate an elongated oval shaped opening 15 is formed in the plate. On the upper side of said opening are a plurality of rack teeth 16, which are adapted to be engaged by a pinion 17. There are two pinions 17 engageable with the two racks 16 at each side of the gin to support the two ends of a shaft 11. These pinions are fixed upon a shaft 18 and are rotatable therewith. Said shaft is rotated through a lever arm 19 fixed to the shaft and projecting upwardly along the side of the gin housing. It has a latch member 20 thereon, which may engage with a sector shaped rack 21 on the side of the housing. This latch 20 may be manipulated at the handle by means of a projecting arm 21 on said latch.

The plates 13, which support the ends of the picker roll, are slidable within a slideway formed between two opposite plates 22. Said plates have an overhanging flange thereon behind which the plates 13 are engaged and allowed to slide. It will, therefore, be seen that the plates at both ends may slide simultaneously through the rotation of the pinions 17, rotatable through the handle 19 fixed thereto. It will also be noted that this adjustment may be made to very slight degrees through the movement of the operating arm 19 along the rack 21.

In the operation of this device the adjustment of the picker roll relative to the gin saws will be necessary when the grade or character of the cotton fed to the gin saws is changed, and this adjustment may be accomplished in the manner desired through the operation of the lever arm 19. When the plate 13, supporting the shaft is moved outwardly the rounded end 14 thereon will engage the breast and move the same along with the picker roll. This movement of the gin breast will, of course, carry the prongs 9 on the deflector board 8 along with the same and thus allow the interfitting of the teeth 10 on the picker roll with said prongs in the same adjustment at all times. When the shaft is moved inwardly carrying the picker roll closer to the gin saws, the gin breast 5 will follow along with the plate 13 by gravity due to the pivoting of said gin breast at the point 7, as previously noted.

The advantage of this structure lies in the convenient manner in which the adjustment may be accomplished without the waste of any material amount of time. The picker roll can be moved without loosening any nuts or making adjustments at the ends thereof, but all that is necessary is a simple swinging of the lever arm 19 to obtain the adjustment desired, and this arm may be secured in adjusted position by means of the latch in the manner described.

What I claim as new is:

1. In a cotton gin including a saw cylinder, a rotating toothed roll positioned in front of said saw cylinder, a shaft for said roll, plates supporting the ends of said shaft, slideways for said plates, racks on said plates, pinions engaging said racks and means to rotate said pinions to slide said plates in said slideways.

2. In a cotton gin, a saw cylinder, a gin breast in front of said cylinder, a spiked roll at the lower end of said breast, means to adjust said roll in a direct line to and from said cylinder, and a board deflecting the cotton to said roll, said board having prongs interfitting with the spikes of said roll, said adjusting means contacting with said gin breast to move said board whereby it is adjustable with said roll.

3. In a cotton gin, a saw cylinder, a gin breast in front of said cylinder, a spiked roll at the lower end of said breast, means to adjust said roll in a direct line to and from said cylinder and a board deflecting the cotton to said roll, said board having prongs interfitting with the spikes of said roll, said board being mounted to swing relative to said cylinder and movable through said adjusting means when said roll is moved.

4. In a cotton gin a saw cylinder, a shaft parallel thereto, a spiked roller mounted on said shaft, journals at the ends of said shaft, plates supporting said journals, slideways for said plates, said plates having elongated openings therein, racks in said openings, pinions in said openings engaging said racks and means to simultaneously rotate said pinions to move said plates and slide said roller to or from said cylinder.

5. In a cotton gin including a saw cylinder, a rotating toothed roll positioned in front of said saw cylinder, a shaft for said roll, a longitudinal slidable plate supporting each of the ends of said shaft, upper and lower slideways for said plates allowing a free lengthwise sliding movement of said plates therein, and means engaging said plates to slide said plates and said shaft in a direct line toward and from said cylinder.

6. In a cotton gin a saw cylinder, a shaft parallel thereto, a spiked roller mounted on said shaft, journals at the ends of said shaft, longitudinally slidable plates supporting said journals, horizontal slideways for said plates, a deflector board adjacent said roller and means to slide said plates therein to adjust the position of said roller and simultaneously adjust said deflector board relative to said cylinder.

In testimony whereof I hereunto affix my signature this 16 day of February, A. D. 1931.

JOHN ARNOLD STREUN.